3,326,676
METHOD OF PRODUCING COHERENT BODIES
OF METALLIC PARTICLES
Werner Rübel, Velbert, Werner Waldhüter, Stadt Allendorf, and Gert Deventer, Munich, Germany, assignors to Deventer-Werke G.m.b.H., Stadt Allendorf, Germany, a corporation of Germany
Filed May 5, 1965, Ser. No. 453,435
11 Claims. (Cl. 75—201)

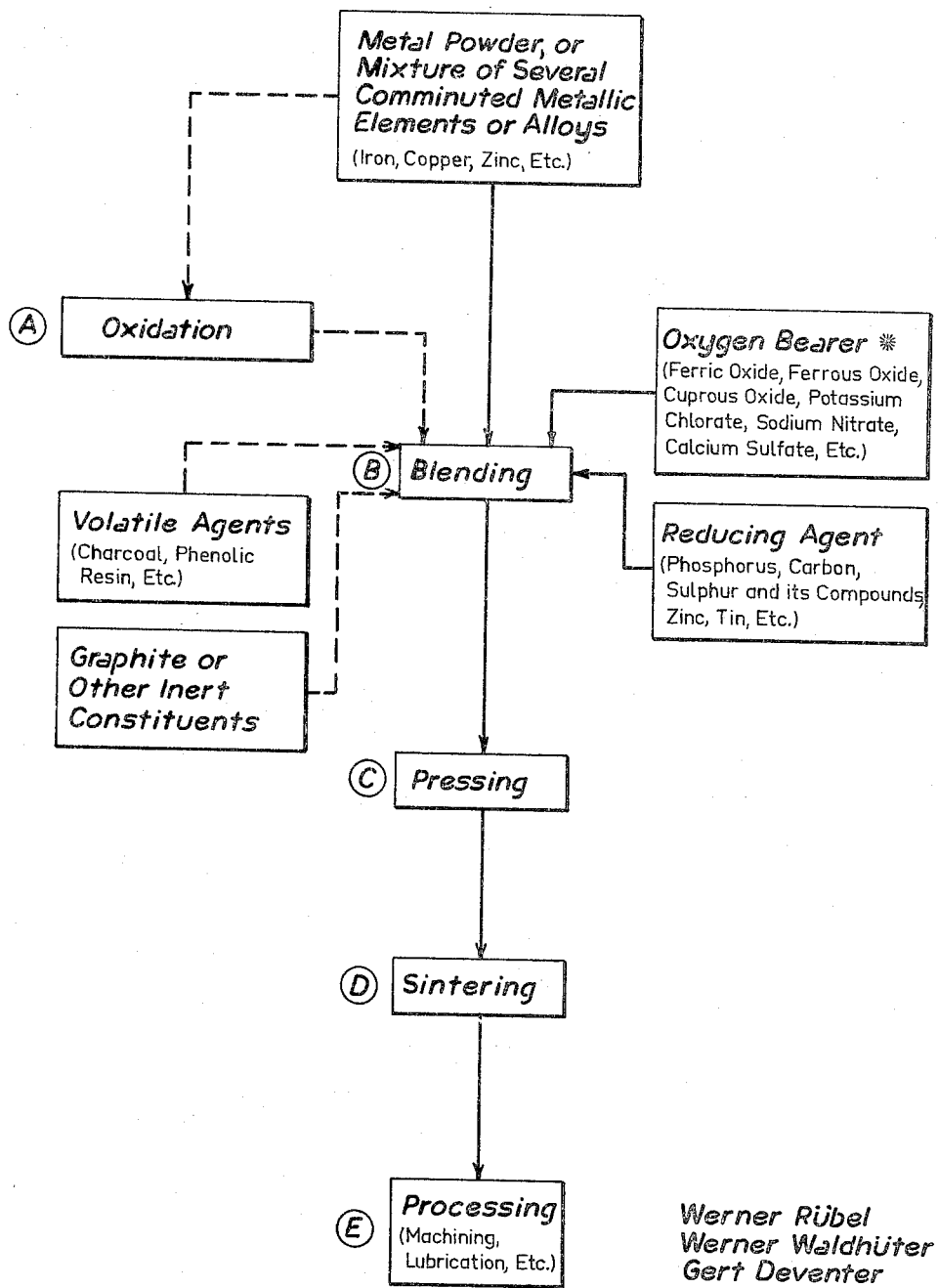

ABSTRACT OF THE DISCLOSURE

A method of sintering metallic particles, especially iron particles, into coherent bodies wherein the iron particles are oxidized by heating them in the presence of moist air to form an oxide coating on the particles, a reducing agent is then admixed with the particles for exothermic reaction with the oxide coating in a stoichiometric quantity sufficient to substantially completely destroy the coating, the mixture is compacted and subjected to activation at a temperature of 600° to 950° C. and well below the normal sintering temperature for iron and in the absence of antioxidation atmosphere to sinter the particles at least in part by the exothermically released heat of reaction.

---

Our present invention relates to the formation of sintered bodies containing metallic particles as described in commonly assigned copending application Ser. No. 260,-992, filed Feb. 26, 1963, now U.S. Patent No. 3,228,074, issued Jan. 11, 1966.

In the afore-mentioned copending application there is described and claimed a method of forming molds designed for the casting of molten metals with surfaces free from discontinuities and characterized by the absence of gaseous inclusions. The molds provided in accordance with this pending application are rendered porous concurrently with the shaping of the mold body from a particulate mass of metallic and ceramic particles by sintering; the mass is combined with exothermically reactable substances which generate localized heat permitting the overall fusion temperature to be reduced and simultaneously giving rise to gaseous products which are evolved to leave voids or pores in the body. This system, which involves the generation of gaseous products in situ, also provides that a binder, preferably volatile at the sintering temperature, be added to the mass prior to its sintering.

Others have proposed the use of exothermically reactable pairs of substances in bodies to be sintered in order to generate within the body part of the heat necessary for a proper effectuation of the sintering reaction. Thus, U.S. Patent No. 2,982,014, issued May 2, 1961 notes that an iron-oxide powder can be reacted with a magnesium powder to yield an iron magnesium oxide of high strength. In accordance with this concept, a mixed or metallic ceramic is obtained with the generation of heat resulting from the exothermic reaction. Prior thereto, however, it was suggested in U.S. Patent No. 2,848,324 of Aug. 19, 1958 that a self-propagating exothermic reaction can be used to form agglomerates. In both cases, the metal oxides serving as the oxygen carrier constitute a major fraction of the mass in order to insure that a combined oxide or the like will be formed. It is not uncommon, therefore, that the methods of these patents are carried out with the mass constituted exclusively of iron oxide and a stoichiometrically equivalent quantity of aluminum or magnesium, with aluminum and magnesium oxides as possible further admixtures compatible with the oxides of the resulting reaction. In spite of the afore-described development of the art, however, a great deal of effort in the powder-metallurgy field has been and is being expended to determine the best possible method of bonding particles together so as to insure a high strength for the sintered body in spite of the possible interfacial intervention of contamining substances. It is thus a problem commonly encountered in this field that relatively fine metal particles cannot be bonded together by conventional compacting and sintering operations unless pretreatments, reducing atmospheres and chemical modifications are used because of the presence of oxide films upon the particles and their interposition between particles in contact with one another. These oxide films can be eliminated by annealing a compacted mass of metal particles in a reducing atmosphere (e.g. containing hydrogen gas) prior to sintering the bodies or by one or another of the techniques described above for this purpose. Nevertheless these problems cannot be eliminated entirely by such pretreatment especially if the particles are relatively fine, because of the almost instantaneous reoxidation of the particles along their surface upon exposure of the particulate mass to oxidizing atmospheres.

It is, therefore, an important object of the present invention to extend the principles set forth in our copending application identified above to the problems involved in the bonding together of particulate masses having oxide films and requiring elevated fusion temperatures.

Another object of our invention is to provide an improved method of bonding together metallic particles of iron and other substances prone to surface oxidation and the development of oxide films by compaction and fusion even in oxidizing atmospheres.

A more specific object of this invention is to provide an improved method of forming metallic or cermet (ceramic-metallic) bodies with reduced treatment temperatures.

The above objects and others will become apparent hereinafter, are attained, in accordance with the present invention, by a method for the production of metallic and cermet bodies whereby the body consists at least in major part of particles of a metal prone to surface oxidation and having an oxide film; the particles of oxidized metal, which consist in major part of the elemental metal since only a film of the metal oxide is present, are mixed with a quantity of a reducing agent at least stoichiometrically equal to that of the oxide film to produce a homogeneous mass. The latter is compacted and brought to a temperature sufficient to cause reaction between the reducing agent and the oxide film and thereby remove this film to permit the elemental metal of the particles to fuse together directly. The reactant substances (i.e. the oxide film and the reducing agents) also permit the use of a fusion temperature substantially lower than the sintering temperatures hitherto required for rendering bodies of such metals coherent because of exothermic heat generation during the oxide-stripping reaction.

According to a further feature of this invention, the reducing agent is a compound which is gaseous at the activation temperature and thus can permeate the mass to react with the oxide film throughout the interstices thereof. Thus the reducing agent may be sulphur, phosporus or a like element added to the mixture in the elemental state or a compound decomposable to provide vapors of the reducing agent at the activation temperature.

According to still another feature of this invention, the activation can be carried out with relatively little heat by admixing with the mass an additional quantity of an oxidizing agent and a corresponding quantity of the reducing agent for exothermically generating the major part of the thermal energy required for fusion. Thus, the total quantity $M_r'$ of the reducing agent will be equal to the sum $M_r'$ and $M_r''$ defining, respectively, the stoichiometric quantities necessary for reaction with the oxide film and the additional quantity of oxide or oxidizing agent provided for reducing the necessary heat input and, therefore, the fusion temperature. From time to time, according to a specific feature of our invention, it may even be desirable to insure the presence of sufficient oxide in the form of surface film to generate, by its reaction with the reducing agent, the localized heat required for fusion.

Thus, the process according to our invention also comprises the steps of combining a metal powder, cermet powder or a mixture of several comminuted metallic elements or alloys, with oxygen bearers and admixed reducing agents, pressing the mixture into a mold, and subjecting the molded mixture to an activating treatment at a low temperature, thereby initiating an exothermic reaction which heats the mixture to the fusion point. The oxygen bearers may be only the oxide films or layers upon the surfaces of the particles to be sintered; when these surfaces are not sufficiently oxide-coated, additional oxygen bearers may be present in the form of powdered metal compounds.

During the activation step, the mixture is subjected to an elevated temperature in a manner analogous to firing ceramics in a kiln. In this procedure, the oxygen bearers and the reducing agents react exothermically with one another, thereby releasing heat energy. The chemical reaction neutralizes the oxygen bearers and reducing agents, and furnishes heat which welds together adjacent surfaces of the metallic particles. After cooling, the sintered article may be used as a finished end product, or it may undergo subsequent machining and processing steps.

The above and other objects, features and advantages of the present invention will become more readily apparent from the following detailed description, reference being made to the accompanying drawing the sole figure of which is a flow sheet exemplifying the sequence of the several operative steps employed in carrying our invention into practice.

A first step A in accordance with one mode of realization of our invention is the surface oxidation of metallic-powder granules. This is accomplished by exposing the granules to an oxidizing atmosphere at elevated temperatures for an appropriate time. For example, iron particles are heated in humid air at 700° C. for about 30 minutes. If the oxidizing atmosphere has a greater oxygen concentration than ambient air, the temperature or exposure time or both, may be reduced. When the granules have a strong affinity for oxygen (i.e. a high surface-area/volume ratio), thereby tending to undergo rapid oxidation, the granules may be simply stored for a time while exposed to air at room temperature.

The oxidation step is also beneficial in purifying the granules whereby undesired impurities upon the surfaces of the granules are volatilized. The volatilization is particularly aided by exposure of the granules to an elevated temperature.

The mixing step B in the process provides a blending of the particles with a reducing agent. Additionally, this mixing step may provide for the blending of an oxygen bearer with the particles and the reducing agent.

Ideally, the metallic grains have a particle size up from about 1 micron to substantially 500 microns, and the oxygen bearers and reducing agents have a grain size up from about 1 micron to substantially 200 microns. Oxygen-bearer additives which can be effectively used include metal oxides (FeO, MnO, CuO, etc.), nitrates, chlorates, chromates, bichromates, permanganates, sulfates, and similar compounds which contain easily reducible irons and/or oxygen in their molecular structure. Preferred reducing agents include readily oxidizable carbon which has bonding orbitals available for oxygen linkages (thus excluding graphite which possesses a structure that is unreactive by means of resonance stabilization), carbon carriers (such as lithium carbide), sulfides (especially bisulfides and polysulfides) and phosphides, and even elements having an affinity for oxygen, such as zinc or tin.

The oxygen bearers and reducing agents should be present in proportions of substantially 0.5% to 5% by weight of the mixture. The upper limit of approximately 5% is, in fact, determined by the solid or gaseous products of the sintering reaction; if this 5% limit is exceeded, the reaction products may cause pressure gradients within the sintered mixture, resulting in cracks, fissures and other flaws.

If an increased porosity is needed in the product, in order to permit inclusion of greases, oils, graphite, or other lubricants within the pore cavities, volatile ingredients may be admixed with the metallic granules during the blending step as set forth in the copending application mentioned above. Volatile agents may include charcoal and phenolic resins, or other similar agents which are readily volatilized during the hot-pressing and sintering steps. The cavities resulting from escape of the volatile agents exceed the porosity of ordinary binder-containing agglomerates. Lubrication properties may be given directly to the mixture by admixing natural graphite therewith during the blending step. Natural graphite is an unreactive additive and remains in the mixture after sintering. These volatile constituents or natural graphite may replace the metallic particles up to substantially 40 parts by weight.

Depending upon the application and use of the product, colloidal graphite or other inert ingredients may be also admixed during the blending step up to substantially 40% by volume. The mixing of the mass is accomplished by any commercially available tumbler, blender, or rotating drum.

Pressing of the mixture is next accomplished at C in a conventional manner by a press and mold; the configuration of the agglomerate is determined by the mold-cavity configuration. Following the pressing step, the "green" body is ready for sintering at D. The sintering temperatures heretofore necessary in powder-metallurgical processes ranged substantially from 1200° C. to 1400° C. However, in our process the presence of reducible-oxygen carriers and reducing agents in the mixture gives rise to an internal exothermic reaction when the agglomerate is heated to an activation temperature. Thus, for the present process, sintering temperatures are substantially lower and range approximately from 400° C. to 800° C. for copper-containing bodies and approximately from 800° C. to 950° C. for iron-particle masses. The secondary heat source of the exothermic reaction allows a significantly lower heat input during sintering.

The release of heat energy within the mass, initiated by the heat input of the sintering step, causes the welding together of adjacent metal particles without the expulsion of lighter materials which may be included in the mixture. Such materials (e.g. graphite) are retained in a metallic bridge structure in quantities of substantially 40% by volume. Moreover "green" bodies are sintered in a normal ambient atmosphere. For example, the reducing atmosphere normally required for sintering iron-powder compacts is not needed.

Sintering times are also shorter than those of conventional powder-metallurgy processes. Sintering of the body for approximately ten minutes yields a satisfactory article. This time reduction results from the internal exothermic heat source which provides rapid and even heating of the compact without adverse temperature gradients.

The finished sintered compact corresponds, qualitatively, to a product obtained in smelting metallurgy.

The exothermic heat energy produced in situ is defined by the following chemical reactions:

(a) $MoS_2 + \Delta H_1 = Mo + 2S$
(b) $2S + 4FeO = 4Fe + 2SO_2 + \Delta H_2$ $\overline{MoS_2 + 4FeO + \Delta H_1 Mo + 4Fe + 2SO_2 + \Delta H_2}$ $\Delta H_1 = 56$ kilocalories per mole
$\Delta H_2 = 115$ kilocalories per mole In reaction 1 above, the reducing agent is molybdenum disulfide and the oxygen bearer is the iron oxide film upon the iron particles. The heat of reaction ($\Delta H_2$) is greater than the heat of dissociation ($\Delta H_1$), where $\Delta H_1$ is endothermic and $\Delta H_2$ is exothermic. Hence, a net exothermic heat energy is evolved. The quantity of the reducing agent employed is at least stoichiometrically equivalent to the oxide in the form of the film and determined by analysis of a sample, with computation in accordance with the mass of iron particles present.

REACTION 2

(a) $12NaNO_3 + \Delta H_1 = 6Na_2O + 12NO + 18O$
(b) $(9+y)FeS + \Delta H_2 = 9Fe + 9S$
(c) $9S + 18O = 9SO_2 + \Delta H_3$
(d) $y/2S + yFe = yFe + y/2 SO_2 + \Delta H_4$ $\overline{12NaNO_3 + 9FeS + (\Delta H_1 + \Delta H_2) = 6Na_2O}$
$+ 12NO + (9+y)Fe + (9+y/2)SO_2 + \Delta H_3 + \Delta H_4$ $\Delta H_1 = 12.29$ kilocalories per mole
$\Delta H_2 = 22.70$ kilocalories per mole
$\Delta H_1 + \Delta H_2 = 34.99$ kilocalories per mole
$\Delta H_3 = 70.98$ kilocalories per mole
$\Delta H_4 = 115$ kilocalories per mole In reaction 2 above, the reducing agent is iron sulfide and the additional oxygen bearer is sodium nitrate; ($y$) FeO represents the oxide film. The heats association and reaction of ($\Delta H_3$) + $\Delta H_4$ are greater than the combined heats of dissociation ($\Delta H_1 + \Delta H_2$), where $\Delta H_1$ and $\Delta H_2$ are endothermic and $\Delta H_3$ is exothermic. Hence, a net exothermic heat energy is evolved.

When ferrous materials are used, the resulting sintered compact has a capacity of deformation between 3% and 8%. Its compressive strength is about 4 times higher than a compact sintered by conventional methods (e.g. without the internal source of exothermic heat energy). Additionally, the tensile strength of copper-base materials (e.g. copper and zinc alloys) corresponds substantially to the tensile strength of materials obtained through smelting metallurgy processes.

The following examples illustrate the process according to our invention in greater detail:

*Example I*

A ferritic mixture comprises substantially an iron powder with 3% iron-oxide film, 8% natural graphite, 1% NaNO, and 0.75% P, approximately all by weight. Thus the phosphorous is sufficient to react with both oxide film and the available oxygen of the nitrate. After blending, the mixture is pressed into a cylindrical mold, and the mass is heated to an ignition temperature of 830° C. to 850° C. for a reaction time of 10 minutes. Metallugrical analysis of the sintered compact reveals:

(a) Compressive strength 1200 to 1500 kg./cm.²,
(b) Tensile strength 6 to 9 kg./mm.²,
(c) Brinell hardness 65 to 75 units.

*Example II*

A ferritic mixture comprises substantially an iron powder with approximately 3% iron-oxide film, 8% natural graphite, 2.5% molybdenum disulfide, and 1% sodium nitrate, by weight. After blending, the mixture is pressed into a cylindrical mold, and the mass is sintered in two different ways.

(1) Sample 1 is heated to an activation temperature of 800° C. for a treatment time of 10 minutes.

(2) Sample 2 is heated to an activation temperature of 850° C. for an annealing treatment time of 10 minutes, followed by hot pressing.

Metallurgical analysis of the sintered compacts reveals the following tabular data:

| Sample | Brinell Hardness | Compressive Strength | Tensile Strength |
|---|---|---|---|
| 1 | 70 units | 1,500 to 2,000 kg./cm.² | 8 to 10 kg./mm.² |
| 2 | 66 units | 2,000 to 2,600 kg./cm.² | 12 to 16 kg./mm.² |

In evaluating this data, it should be noted that the inclusion of 8% by a light natural graphite corresponds to 15 to 25% by volume. Consequently, the strength of purely metallic sintered compacts would be greater.

*Example III*

A copper-base mixture comprises substantially 60% copper powder, 30% zinc powder, 5% natural graphite, 3% molybdenum disulfide, 1% copper oxide as oxide film, and 1% sodium nitrate. After blending, the mixture is pressed into a mold, and the body is heated to an activation temperature of 550° C. and annealed without a reducing atmosphere. The resulting sintered body corresponds in qualitative properties to a brass alloy, but with improved lubrication and endurance properties.

After the sintered compact emerges from the sintering oven, it may be used as it is for a finished end product. However, should it have a specialized application, the compact may undergo subsequent machining at E and/or lubrication steps to yield a final product.

We claim:

1. A method of producing a coherent body from particles of iron having an oxide coating, comprising the steps of homogeneously admixing with said particles a reducing agent capable of exothermic reaction with said oxide coating at a predetermined activation temperature in the range of substantially 600° to 950° C. to yield a gaseous product in an amount at least stoichiometrically equal to that quantity of oxide present; pressing the resulting admixture to produce a compacted body; and heating said body in the absence of an antioxidation atmosphere to said activation temperature of substantially 600 to 950° C. to react said reducing agent with said oxide and destroy said coating while fusing the particles of iron to coherency.

2. The method defined in claim 1, further comprising the step of admixing with said particles an oxidizing agent exothermically reactable with said reducing agent, said reducing agent being present in an amount at least equal to that stoichiometrically required to react with both said oxidizing agent and said coating and to generate sufficient internal heat within said body to fuse said particles together at said activation temperature.

3. The method defined in claim 2 wherein the heating of said body is carried out in an oxidizing atmosphere and a sufficient quantity of said reducing agent is present within said body to react with oxides formed during the heating step between said metal and the atmosphere.

4. The method defined in claim 2 wherein said agents are each present in an amount ranging between substantially 0.5 and 5% weight of said body.

5. The method defined in claim 2, further comprising the step of admixing with said particles colloidal graphite in an amount ranging up to 40% by volume of said admixture.

6. The method defined in claim 2 wherein said particles have a maximum particle size of substantially 500 microns and said agents are particulate with a maximum particle size of substantially 200 microns.

7. The method defined in claim 2 wherein said reducing agent is selected from the group which consists of phosphorous, carbon, sulphur and compounds thereof, zinc and tin.

8. The method defined in claim 2 wherein said oxidizing agent is selected from the group which consists of iron oxide, copper oxide, potassium chlorate, sodium nitrate and calcium sulphate.

9. The method defined in claim 2, further comprising the step of admixing with said particles a readily volatizable constituent prior to compacting the admixture.

10. A method of producing a coherent body from metallic particles, comprising the steps of oxidizing said particles by heating same in oxidizing atmosphere to form oxide coatings thereon; homogeneously admixing with said particles a reducing agent capable of exothermic reaction with said oxide coating at a predetermined activation temperature to yield a gaseous product in an amount at least stoichiometrically equal to that quantity of oxide present; pressing the resulting admixture to produce a compacted body; and heating said body to said activation temperature to react said reducing agent with said oxide and destroy said coating while fusing said particles to coherency.

11. A method of producing a coherent body from iron particles, comprising the steps of oxidizing said particles by heating same in oxidizing atmosphere to form oxide coatings thereon; homogeneously admixing with said particles a reducing agent capable of exothermic reaction with said oxide coating at a predetermined activation temperature in the range of substantially 600° to 950° C. to yield a gaseous product in an amount at least stoichiometrically equal to that quantity of oxide present; pressing the resulting admixture to produce a compacted body; and heating said body to said activation temperature in the absence of an antioxidation atmosphere to react said reducing agent with said oxide and destroy said coating while fusing said particles to coherency.

References Cited
UNITED STATES PATENTS

| | | | |
|---|---|---|---|
| 908,930 | 1/1909 | Zerning | 75—224 |
| 2,122,053 | 6/1938 | Burkhardt | 75—224 |
| 2,129,844 | 9/1938 | Kiefer | 75—211 |
| 2,254,549 | 9/1941 | Small | 75—224 |
| 2,982,014 | 5/1961 | Meyer-Hartwig | 75—206 |
| 3,050,386 | 8/1962 | Von Dohren | 75—222 |
| 3,142,892 | 8/1964 | Powell et al. | 75—222 |
| 3,232,754 | 2/1966 | Storchheim | 75—222 |

FOREIGN PATENTS

| | | |
|---|---|---|
| 600,829 | 4/1948 | Great Britain. |
| 609,689 | 10/1949 | Great Britain. |

CARL D. QUARFORTH, *Primary Examiner.*

L. DEWAYNE RUTLEDGE, *Examiner.*

R. L. GRUDZIECKI, *Assistant Examiner.*